United States Patent [19]

Chu et al.

[11] Patent Number: 5,055,440
[45] Date of Patent: Oct. 8, 1991

[54] CATALYST AND METHOD FOR ITS MANUFACTURE

[75] Inventors: Wing F. Chu, Leimen; Franz-Josef Rohr, Absteinach; Andreas Reich, Heidelberg, all of Fed. Rep. of Germany

[73] Assignee: Asea Brown Boveri Aktiengesellschaft, Mannheim, Fed. Rep. of Germany

[21] Appl. No.: 427,089

[22] PCT Filed: Dec. 8, 1988

[86] PCT No.: PCT/EP88/01126
§ 371 Date: Oct. 10, 1989
§ 102(e) Date: Oct. 10, 1989

[87] PCT Pub. No.: WO89/05187
PCT Pub. Date: Jun. 15, 1989

[30] Foreign Application Priority Data

Dec. 10, 1987 [DE] Fed. Rep. of Germany ....... 3741887

[51] Int. Cl.$^5$ ..................... B01J 23/10; B01J 23/72; B01J 23/78
[52] U.S. Cl. .................. 502/303; 502/524; 502/525
[58] Field of Search ........... 502/303, 524, 525

[56] References Cited

U.S. PATENT DOCUMENTS 3,929,670 12/1975 Kudo et al. ............... 502/303 X
4,055,513 10/1977 Wheelock ..................... 502/303
4,820,678  4/1989 Xu ................................ 502/303

Primary Examiner—W. J. Shine
Attorney, Agent, or Firm—Herbert L. Lerner; Laurence A. Greenberg

[57] ABSTRACT

A catalyst is used for removing toxic substances from the exhaust gases of combustion installations and internal combustion engines, by reduction with carbon monoxide, hydrogen, hydrocarbons or ammonia. The catalyst is produced using a single-phase or multi-phase mixed oxide system with a pure perovskite structure or a perovskite and spinel structure. To produce the catalyst, carbonates or oxides of lanthanum, strontium, manganese, iron and copper are mixed, crushed, dried and ground to a fine powder with a particle size between 0.1 and 5 microns. This powder is then processed to form a catalytically active layer.

4 Claims, 1 Drawing Sheet

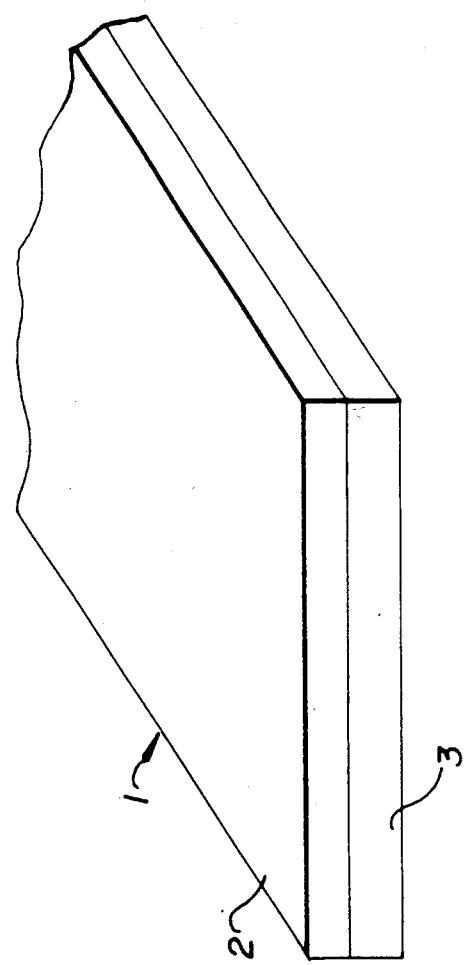

CATALYST AND METHOD FOR ITS MANUFACTURE

FIELD OF THE INVENTION

The invention relates to a catalyst for the elimination of toxic substances in exhaust gases and more particularly for eliminating nitrogen oxides in flue gases. The SCR method (selective catalytic reduction) has theretofore been preferably used for such detoxification.

In this selective catalytic reduction method, the nitrogen oxides ($NO_x$) are reduced by means of the ammonia ($NH_3$) admixed with the flue gas in a catalyst of titanium oxide and vanadium oxide ($TiO_2/V_2O_3$) at 300° to 400° C., forming harmless nitrogen and water. A disadvantage of the catalysts used in the SCR method is that they are unsuitable for eliminating reducing agents contained in fuel or exhaust gas, such as carbon monoxide, hydrogen or hydrocarbons, and in practical use have only a very short service life. These disadvantages, as well as the necessity of using ammonia as a reducing agent, limit the technical practicability of the SCR method considerably. Additional difficulties arise in the storage of the ammonia, as well as in dispensing it accurately. Moreover, the formation of solid ammonium sulfide residues limits the practicability of this methods.

THE INVENTION

It is therefore the first object of the invention to devise a catalyst that enables the reduction of exhaust nitrogen oxides using and containing carbon monoxide, hydrogen and hydrocarbons as well as ammonia, and secondly to disclose a method with which such a catalyst can be manufactured.

The first object is attained by the catalyst according to claims 1 and 13.

The second object is met by a method for the manufacture of such a catalyst is disclosed in claims 14 and following.

The catalyst according to the invention is distinguished by a long service life, which is dictated by its thermal, chemical and mechanical stability. With it, nitrogen oxides can be reduced with the aid of carbon monoxide, hydrogen and hydrocarbons, which are contained in every exhaust gas from internal combustion engines and combustion systems. Reduction by the additional use of ammonia is also possible with this catalyst. The pore size of the catalyst material is selected such that overly large pores do not reduce the active surface area. Nor are the pores too small, so the diffusion of the chemical reactants into the catalyst and the diffusion of the reaction products out of it is not hindered.

The mixed oxides of perovskite structure, or perovskite spinel structure, used for manufacturing the catalyst are distinguished, over a wide temperature range, between room temperature and a temperature of 1200° C., by high thermal stability and chemical resistance to hot gases, which entrain with them components in the form of corrosive substances, such as oxygen, sulfur, sulfur oxides, sulfates, vanadous compounds, and various alkali salts. The catalytic activity of these mixed oxides, especially in the reduction of nitrogen oxides by means of carbon monoxide, hydrogen, hydrocarbons or ammonia, is based on the action of the d-electron orbitals of the transition metal ions that are contained in each of these mixed oxides and are preferably located on the surface of the completed catalyst. In the cubic perovskite lattice of the aforementioned mixed oxides, the ions of the transition metals and the oxygen ions are located on the 100 face of the lattice. On the surface of these crystallites, the ions of the transition metals of these mixed oxides are unsaturated, because of the lack of oxygen ions. These unsaturated ions effect charge transfer processes with adsorbed molecules from the gas phase. As a result, the reduction of nitrogen oxides is effected in the presence of suitable reducing agents such as carbon monoxide, hydrogen and hydrocarbons and ammonia.

Mixed oxides of spinel structure also contains ions of the transition metals on the crystal surface. The catalytic activity of the pure spinels is lower by comparison with the mixed oxides of pure perovskite structure. By suitable combination of mixed oxides of perovskite structure and those of spinel structure, the catalytic activity of these mixed oxides for the reduction of the nitrogen oxides can be very markedly improved.

Further characteristics essential to the invention are defined by the dependent claims.

The manufacture of the catalyst according to the invention will now be described, referring to a drawing.

BRIEF DESCRIPTION OF THE DRAWING

The sole figure pertaining to the description shows a catalyst 1. The actual catalyst material 2 is applied to a substrate 3. It is formed by a single- or multi-phase mixed oxide system. This mixed oxide system may for instance have a pure perovskite structure, or a mixed perovskite/spinel crystalline structure. The preferred mixed oxide systems have the following composition:

$$La_{1-x}Sr_xFe_{1-y}Cu_yO_3$$

Suitable mixed oxide systems of perovskite/spinel structure have the composition:

$$La_{1-x}Sr_xFeO_3/Cu_2FeO_4$$

$$La_{1-x}Sr_xFeO_3/Cu_2FeO_4/Fe_3O_4$$

In the above compositions, x may have a value between 0.1 and 0.6, while y may assume a value between 0 and 0.6. Specialized examples for the above-described general compositions of the possible mixed oxides are described below.

The first composition has a mixed oxide of pure perovskite structure:

$$La_{0.8}Sr_{0.2}Fe_{0.84}Cu_{0.16}O_3$$

The compositions shown below are examples of mixed oxides of perovskite and spinel structure:

$$La_{0.8}Sr_{0.2}FeO_3/CuFeO_4$$

or $$La_{0.8}Sr_{0.2}FeO_3/Cu_2FeO_4/Fe_3O_4$$

To prepare these above-described compositions, carbonates or oxides of the metals that form the mixed oxides are used. For instance, 25 mol% $La_2O_3$, 12.5 mol% $SrO$, 50 mol% $Fe_2O_3$ and 12.5 mol% $Cu_2O$ are mixed together, to obtain one of the desired compositions. The mixture of the aforementioned oxides is ground dry for at least an hour in a ball mill or vibration grinding mill. Next, this powder is sintered for four hours at 1300° C., and by solid-state reactions, the desired mixed oxide formation is formed. To produce catalysts having the required large specific surface areas, the sintered cake is ground in a vibration grinding mill to a very fine-grained powder. The powder sought should have a grain size between 0.1 and 5 μm. The sintered cake, after being ground to the powder having the desired grain size, is processed to make a porous granulate having a diameter between 2 and 5 mm, or into porous honeycomb structures. To this end the fine-grained powder has an organic binder added to it, and optionally a propellant or pore forming agent as well. All three conditions are met for instance by ammonium bicarbonate and/or polyethylene glycols. By compression or extrusion, a catalyst in the form of the porous granulate having the desired diameter, or in the form of the desired honeycomb structure, can be formed. By an ensuing thermal decomposition of the organic binder or propellant added, with a heat treatment in air and an ensuing sintering at 1000° to 1200° C., a catalyst material is manufactured that is distinguished by high mechanical, thermal and chemical stability.

To manufacture a catalyst 1, of the kind shown in the drawing, first a suspension of 50% by weight of the fine-grained powder is formed, the preparation of which is described above. Preferably a powder is used that has a grain size between 0.1 and 5 μm. To this powder, 7.5% by weight of ammonium carbonate or polyethylene glycols and 42.5% by weight of ethyl alcohol or isopropyl alcohol, which serves as a suspension agent, is added. The weight figures given refer to the total weight of the suspension. The quantity of propellant and pore forming agents is selected to be large enough that pores are formed in the catalyst material having a diameter of from 0.1 to 0.5 μm, and at least 30% of the pores formed have this size. In the catalyst 1 shown, the catalyst material 2 is applied to a ceramic substrate 3. The substrate 3 may be manufactured from fine-pored alpha aluminum oxide, cordierite, or mullite. Other ceramic materials that meet the conditions required may also be used to form the substrate. The substrate material must likewise have pores, the diameter of which is from 6 to 7 μm. At least 50% of the pores should have this diameter. Primarily, this ceramic material must meet the condition that it is readily compatible with the catalyst material 2. The catalyst material 2 may be applied to the surface of the substrate by immersion or spraying using the above-prepared suspension. By drying and heating in air, the suspension agent and the propellant or pore forming agent are thermally decomposed. The remaining residue is the fine-grained catalyst material 2. This material is sintered to the surface of the substrate 3 at 1200° C.

The manufacture of a catalyst having a substrate can also be accomplished by precipitation of an organic or inorganic solution onto the surface of the substrate. According to the invention, organic or inorganic chemical compounds of the metal components that form the catalyst material are used to embody the solution. Preferably, a salt solution is formed, for instance a nitrite solution of lanthanum, iron, copper and strontium. An organic solution is preferably prepared from alcoholates or oxalates of these metals. As the solvent, an alcohol is preferably used. The substrate used to form the catalyst is manufactured from one of the above-described materials. This substrate is impregnated with the solution. It is subsequently dried. Next, at negative pressure and at a temperature of 800° to 1100° C., the organic or inorganic chemical compounds of the metal components are decomposed, forming a fine-grained catalyst material. The catalyst material forming on the surface of the substrate has a grain size between 0.1 and 1 μm. During the above-described heat treatment at temperatures between 800° and 1100° C., this catalyst material is simultaneously sintered onto the surface of the substrate. If organic solutions as described above are used, then it is suitable to hydrolyze the substrate by treating it with water or water vapor after the impregnation with the solution. Once the catalyst material has been sintered on, the catalyst is complete.

The use of a ceramic substrate is not absolutely necessary. It merely facilitates the securing of the catalyst 1 to other components (not shown here). At the same time, the substrate can protect the catalyst material against corrosion or can prevent incompatibility with materials of other components, because with it, direct contact is avoided.

It is also possible to apply the catalyst material to a foundation from which it can later be detached, so that the catalyst 1 is formed solely by the layer 2.

We claim:

1. A catalyst for the elimination of toxic substances in exhaust gases from combustion systems and internal combustion engines, the catalyst consisting essentially of at least one layer of catalytic material, wherein said catalytic material consists essentially of at least one mixed oxide system having unsaturated ions on its surface that effect charge transfer processes and having the following composition:

$$La_{0.8}Sr_{0.2}Fe_{0.84}Cu_{0.16}O_3.$$

2. A catalyst for the elimination of toxic substances in exhaust gases from combustion systems and internal combustion engines, said catalyst having at least one layer of catalytic material of at least one mixed oxide system, having unsaturated ions on its surface that effect charge transfer processes and having a mixed oxide composition selected from the group consisting of:

$$La_{0.8}Sr_{0.2}FeO_3/Cu_2FeO_4$$

and $$La_{0.8}Sr_{0.2}FeO_3/Cu_2FeO_4/Fe_3O_4.$$

3. A method for manufacturing a catalytic element for the elimination of toxic substances in exhaust gases from combustion systems and internal combustion engines having at least one layer of catalytic material, according to claim 1 which comprises the steps wherein 25 mol% $La_2O_3$, 12.5 mol% $SrO$, 50 mol% $Fe_2O_3$ and 12.5 mol% $Cu_2O$ in powder form are mixed, dried and ground for at least one hour, and then the fine powder mixture thus formed in sintered at 1300° C. for forming catalytic compounds of perovskite crystalline structures or perovskite and spinel crystalline structures, said catalytic compounds having compositions selected from the group consisting of:

$$La_{0.8}Sr_{0.2}Fe_{0.84}Cu_{0.16}O_3,$$

$$La_{0.8}Sr_{0.2}FeO_3/Cu_2FeO_4,$$

$$La_{0.8}Sr_{0.2}FeO_3/Cu_2FeO_4/Fe_3O_4$$

and mixtures thereof; grinding said sintered catalytic compounds to a grain size in the range 0.1 to 5.0 μm and suspending 50% by weight of said ground material in a suspension medium comprising about 7.5% by weight of ammonia bicarbonate and/or polyethylene glycol in about 42.5% by weight of ethanol to form a suspension of said catalytic material; coating said catalyst suspension upon a substrate selected from the group consisting of fine pored alpha aluminum oxide, cordierite, mullite to form a composite; drying said coated composite by heating to dry and decompose said suspension medium leaving a catalytic layer on said substrate; sintering said coated substrate at a temperature of about 1200° C. to form the catalytic element.

4. A method for manufacturing a catalytic element for the elimination of toxic substances in exhaust gases from combustion systems and internal combustion engines having at least one layer of catalytic material, according to claim 1 which comprises the steps of mixing 25 mol% $La_2O_3$, 12.5 mol% SrO, 50 mol% $Fe_2O_3$ and 12.5 mol% $Cu_2O$ in powder form and then grinding for at least one hour, the powder mixture thus formed is sintered at 1300° C. for forming catalytic composites of perovskite crystalline structures or perovskite and spinel crystalline structures, said catalytic compounds having compositions selected from the group consisting of:

$La_{0.8}Sr_{0.2}Fe_{0.84}Cu_{0.16}O_3$, $La_{0.8}Sr_{0.2}FeO_3/Cu_2FeO_4$, $La_{0.8}Sr_{0.2}FeO_3/Cu_2FeO_4/Fe_3O_4$ and mixtures thereof grinding said compounds to a grain size in the range 0.1 to 5.0 μm mixing said grinding compounds with about 7.5 wt.% of ammonium bicarbonate and/or polyethylene glycols as propellants and pore-forming agents, compressing said mixture and extruding same to form shaped particles in the form of granulates or honeycomb structures; decomposing the propellants and pore-forming agents by heating the mixture in air and then sintering the shaped catalyst material at 1000° to 1200° C. to form the shaped catalytic elements of this invention.

* * * * *